(12) United States Patent
Korn et al.

(10) Patent No.: US 6,611,877 B2
(45) Date of Patent: *Aug. 26, 2003

(54) SYSTEM AND METHOD FOR AGGREGATING REGISTRATION OF ENTITIES FOR NOTIFICATIONS OF EVENTS

(75) Inventors: Peter A. Korn, Oakland, CA (US); William D. Walker, Nashua, NH (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,016

(22) Filed: Jun. 30, 1998

(65) Prior Publication Data

US 2002/0035649 A1 Mar. 21, 2002

(51) Int. Cl.[7] .................................................. G06F 9/46
(52) U.S. Cl. ....................................................... 709/318
(58) Field of Search ................................. 709/201, 315, 709/310, 313, 318, 224; 717/1; 705/26

(56) References Cited

U.S. PATENT DOCUMENTS

| | | | | | |
|---|---|---|---|---|---|
| 3,988,714 | A | * | 10/1976 | Bardotti | 714/800 |
| 5,090,014 | A | * | 2/1992 | Polich et al. | 714/26 |
| 5,404,532 | A | * | 4/1995 | Allen et al. | 709/318 |
| 5,469,463 | A | * | 11/1995 | Polich et al. | 714/20 |
| 5,602,998 | A | * | 2/1997 | Alferness et al. | 712/225 |
| 5,822,583 | A | * | 10/1998 | Tabuchi | 709/100 |
| 6,145,009 | A | * | 11/2000 | Miyazawa et al. | 709/236 |
| 6,212,676 | B1 | * | 4/2001 | Seaman et al. | 717/4 |

\* cited by examiner

*Primary Examiner*—St. John Courtenay, III
*Assistant Examiner*—Van H. Nguyen
(74) *Attorney, Agent, or Firm*—Kudirka & Jobse, LLP (57) ABSTRACT

An event aggregator allows an application program to receive notification of events generated by selected objects without registering as a listener for events with each object. The event aggregator has a registration list module that receives a registration request from the application program indicating from which object types the application program wants to receive notification of events, an object monitor that continually checks the computer system for objects and registers a listener with each object; and an event monitor that that notifies the application program if any listener receives notification of an event generated by an object type indicated by the registration request.

18 Claims, 5 Drawing Sheets

SYSTEM AND METHOD FOR AGGREGATING REGISTRATION OF ENTITIES FOR NOTIFICATIONS OF EVENTS

FIELD OF THE INVENTION

The invention relates generally to the field of digital computer systems and more particularly to arrangements for notifying programs of the occurrence of events which occur in connection with various objects such systems. The invention particularly provides an arrangement for use in a digital computer system which simplifies providing notification of events in connection with the various objects and other elements of a graphical user interface ("GUI") which normally would be displayed on a video display device, to programs which control processing by the digital computer systems in connection therewith.

BACKGROUND OF THE INVENTION

The development of inexpensive and high-powered computer systems, such as personal computers, computer workstations and the like has led to an increase in the availability of sophisticated computer technology to large numbers of people, Generally, a personal computer, workstation or the like includes processor, a video display through which the computer can display information to an operator, and operator input devices such as a keyboard, a pointing devices such as a mouse or the like, which the operator can use to input information to the computer. The development of graphical user interfaces (GUI's) has made computers easier for many to use. In a graphical user interface, the computer displays information to an operator in graphical form on a video display, and allows the operator to manipulate the displayed graphical information to control the computer by manipulating the pointing device.

In a computer employing a graphical user interface, information is displayed in the form of objects, including icons, windows and window components, boxes, and the like. Other objects which may be used in a graphical user interface include, for example, window components such as a title bar, menu, scroll bars and elements thereof, various kinds of boxes such as dialog boxes, check boxes, message boxes and the like, and various types of push buttons which may be actuated by the operator to enable certain operations to occur. Generally, when an event occurs in connection with a graphical user interface object, one or more application programs are provided with a notification of the event, after which it or they (that is, the application program(s)) can perform predetermined operations. Generally, when an event occurs in connection with an object used in the graphical user interface, a notification of the event is entered into an event queue maintained by the digital computer system's operating system. The event notifications are generally listed in the event queue in the order in which the operator performs events in connection with the various objects. An application program which needs to be notified of events which occur in connection with an object registers a "listener" for the object, which serve to check the event queue to determine when the event queue includes an event notification for that object. An application program will typically need to register a listener for each object for which it requires notification. When a listener determines that the event queue includes a notification for an event in connection with its object, it (that is, the listener) will, in turn provide a notification to the application program of the event.

Typically, an application program will need to be notified of events which occur in connection with only a relatively small number of objects used in a graphical user interface, generally only the objects which comprise its window and objects which it has requested the operating system to generate. In such a case, the application program can easily determine when it needs to register a listener for the respective objects. However, some types of programs may need to receive notifications of events which occur in connection with all, or at least a large number, of the objects comprising the graphical user interface. For example, so-called "assistive technology" programs, which typically are used to assist operators who have various kinds of disabilities to use computers, may need to receive notifications of events so that they can perform an operation which can, for example, provide a non-visual indication of the event. Thus, in connection with an assistive technology program which is used in connection with a graphical user interface may, when an event occurs in connection with an object in the graphical user interface which would typically be displayed by the video display device to provide a visual notification of the event to the operator, also enable speakers to generate a sound when the event occurs, thereby to provide an audible notification of the event to the operator. Thus, the assistive technology program can assist a sight-impaired person to use the computer. However, to accomplish that, the assistive technology program will need to receive notifications of events which occur in connection with many, if not all of the objects in the graphical user interface, most of which it (that is, the assistive technology program) will not have enabled the digital computer system's operating system to generate. In addition, the assistive technology program will need to receive notification of events in connection with objects, at least some of which will likely have been instantiated after the assistive technology program was initialized, which would require the assistive technology program not only to identify the objects comprising the graphical user interface which exist when it is initialized for which it will need to register listeners, but also to continuously monitor the subsequent instantiation of such objects by the operating system so that it can determine whether the register listeners therefor. These requirements can complicate development of assistive technology programs.

SUMMARY OF THE INVENTION

The invention provides a new and improved arrangement for use in a digital computer system which simplifies providing notification of events in connection with the various objects and other elements of a graphical user interface ("GUI") which normally would be displayed on a video display device, to programs which control processing by the digital computer systems in connection therewith.

In brief summary, the invention provides an event notification subsystem for use in connection with a digital computer system provides notification of the occurrence of events which occur in connection with objects in the digital computer system to application programs. The event notification subsystem includes an event monitor that establishes respective listeners associated with the respective objects that determines when events occur in connection therewith. The event monitor, in response to receipt of notification from a listener that an object has notified it that an event has occurred in connection therewith, in turn notifies ones of the application programs which are registered therewith which have indicated to the event monitor that they wish to receive notifications for the respective object.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
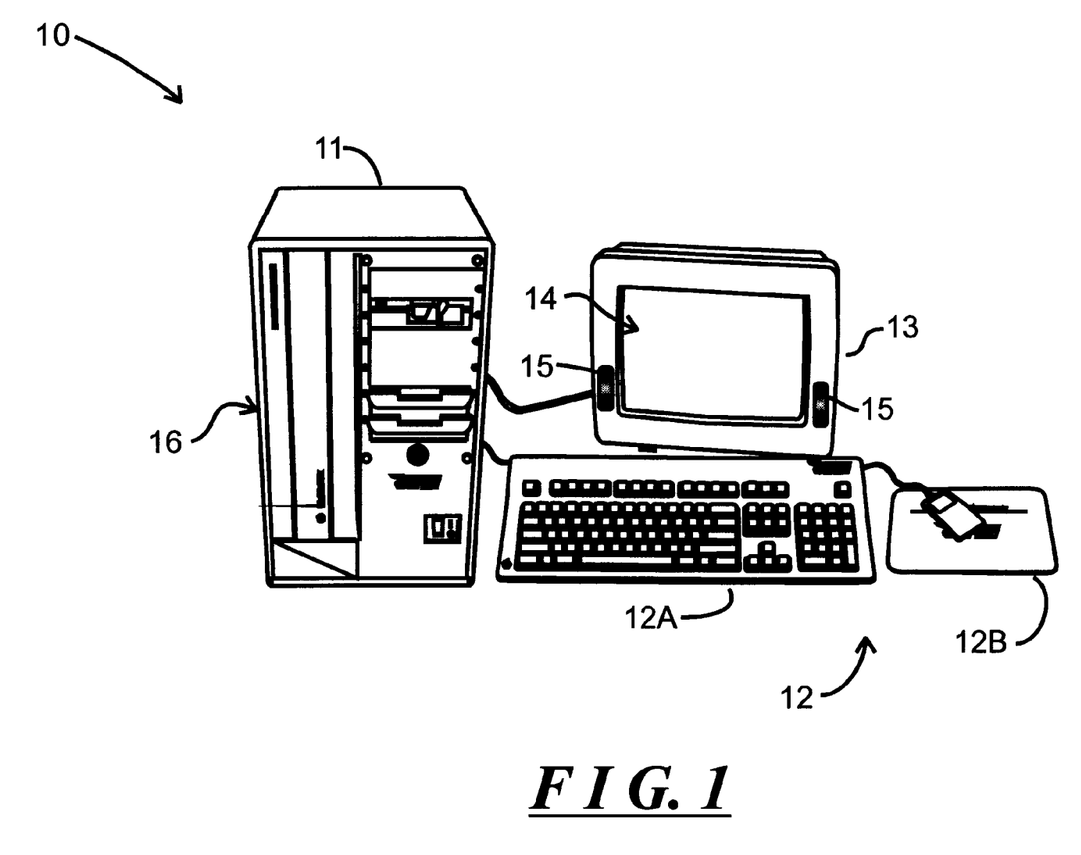
FIG. 1 depicts an illustrative digital computer system including an event notification arrangement for providing notification of events in connection with the various objects and other elements of a graphical user interface ("GUI") which normally would be displayed on a video display device, to programs which control processing by the digital computer systems in connection therewith.

FIG. 1 depicts an illustrative digital computer system 10 including an event notification arrangement for providing notification of events in connection with the various objects and other elements of a graphical user interface ("GUI") which normally would be displayed on a video display device, to programs which control processing by the digital computer systems in connection therewith. With reference to FIG. 1, the computer system 10 in one embodiment includes a processor module 11 and operator interface elements comprising operator input components such as a keyboard 12A and/or a mouse 12B (generally identified as operator input element(s) 12) and operator output components such as a video display device 13 with integral speakers 15. The illustrative computer system 10 is of the conventional stored-program computer architecture.

The processor module 11 includes, for example, processor, memory and mass storage devices such as disk and/or tape storage elements (not separately shown) which perform processing and storage operations in connection with digital data provided thereto. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the processor, information stored in the mass storage subsystems may be transferred to the memory for storage. After the information is stored in the memory, the processor may retrieve it from the memory for processing. After the processed data is generated, the processor may also enable the mass storage subsystems to retrieve the processed data from the memory for relatively long-term storage.

The operator input element(s) 12 are provided to permit an operator to input information for processing and/or control of the digital computer system 10. The video display device 13 and speakers 15 are provided to, respectively, display visual output information on a screen 14, and audio output information, which are generated by the processor module 11, which may include data that the operator may input for processing, information that the operator may input to control processing, as well as information generated during processing. The processor module 11 generates information for display by the video display device 13 using a so-called "graphical user interface" ("GUI"), in which information for various applications programs is displayed using various windows, icons and other objects. Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 may include one or more network or communication ports, generally identified by reference numeral 15, which can be connected to communication links to connect the computer system 10 in a computer network, or to other computer systems (not shown) over, for example, the public telephony system. The ports enable the computer system 10 to transmit information to, and receive information from, other computer systems and other devices in the network.

As noted above, the video display device 13 displays information generated by the processor module 11 to the operator using a graphical user interface, in which information for various application programs is displayed using various windows, icons and other objects. Other objects which may be used in a graphical user interface include, for example, window components such as a title bar, menu, scroll bars and elements thereof, various kinds of boxes such as dialog boxes, check boxes, message boxes and the like, and various types of push buttons which may be actuated by the operator to enable certain operations to occur. Other types of objects will be apparent to those skilled in the art. The invention provides an arrangement, which will be described below in connection with FIG. 2, for providing application programs with notification of events which occur in connection with such objects. Illustrative types events for which an application program may need notification include, for example, whether the operator "clicks" on an object using a pointing device such as the mouse 12B, whether the object has "focus," that is, whether the object is selected so that, if another operation occurs, such as if the operator depresses the enter key on the keyboard 12A, the object will be actuated such that an application program is to perform an operation in connection therewith, and the like. Various types of events will be apparent to those skilled in the art.

Generally, when an event occurs in connection with an object used in the graphical user interface, a notification of the event is entered into an event queue maintained by the digital computer system's operating system. The event notifications are generally listed in the event queue in the order in which the operator performs events in connection with the various objects. An application program which needs to be notified of events which occur in connection with an object registers a "listener" for the object, which serve to check the event queue to determine when the event queue includes an event notification for that object. An application program will typically need to register a listener for each object for which it requires notification. When a listener determines that the event queue includes a notification for an event in connection with its object, it (that is, the listener) will, in turn provide a notification to the application program of the event.

Typically, an application program will need to be notified of events which occur in connection with only a relatively small number of objects used in a graphical user interface, generally only the objects which comprise its window and objects which it has requested the operating system to generate. In such a case, the application program can easily determine when it needs to register a listener for the respective objects. However, some types of programs may need to receive notifications of events which occur in connection with all, or at least a large number, of the objects comprising the graphical user interface. For example, so-called "assistive technology" programs, which typically are used to assist operators who have various kinds of disabilities to use computers, may need to receive notifications of events so that they can perform an operation which can, for example, provide a non-visual indication of the event. Thus, in connection with an assistive technology program which is used in connection with a graphical user interface may, when an event occurs in connection with an object in the graphical user interface which would typically be displayed on the video display device 13 to provide a visual notification of the event to the operator, also enable the speakers 15 to generate a sound when the event occurs, thereby to provide an audible notification of the event to the operator. Thus, the assistive technology program can assist a sight-impaired person to use the computer, but it will be appreciated that, to accomplish that, the assistive technology program will need to receive notifications of events which occur in connection with many, if not all of the objects in the graphical user interface, most of which it (that is, the assistive technology program) will not have enabled the digital computer system's operating system to generate. In addition, the assistive technology program will need to receive notification of events in connection with objects, at least some of which will likely have been instantiated after the assistive technology program was initialized, which would require the assistive technology program not only to identify the objects comprising the graphical user interface which exist when it is initialized for which it will need to register listeners, but also to continuously monitor the subsequent instantiation of such objects by the operating system so that it can determine whether to register listeners therefor. It will be appreciated that these requirements can complicate development of assistive technology programs.

The invention provides an arrangement whereby an application program, such as an assistive technology program, can easily be registered through a listener to receive notifications of events which occur in connection with objects comprising the graphical user interface, without the necessity of requiring it (that is, the application program) itself to actually register a listener for each of the objects. In particular, the invention provides a single event queue monitor, with which the assistive technology program can register once. The event queue monitor, in turn, monitors instantiation of objects comprising the graphical user interface by the operating system and registers listeners in connection therewith. The listeners monitor the event queue and provide notifications of events which the objects have loaded therein to the event queue monitor. The event queue monitor, in turn, receives the notifications from the listeners, determines whether any of the assistive technology programs registered therewith need to receive such notifications, and, if so, provides the appropriate notifications to the assistive technology application. Thus, the event queue monitor relieves the assistive technology program of the needs to (i) identify the objects comprising the graphical user interface that already exist when it (that is, the assistive technology program) is initialized, and to register listeners therewith, and also to (ii) monitor the subsequent instantiation of such objects by the operating system so that it can determine whether the register listeners therefor, and to register listeners with the ones of the objects for which it (that is, the assistive technology program) wishes to receive notifications.

Figure 2:
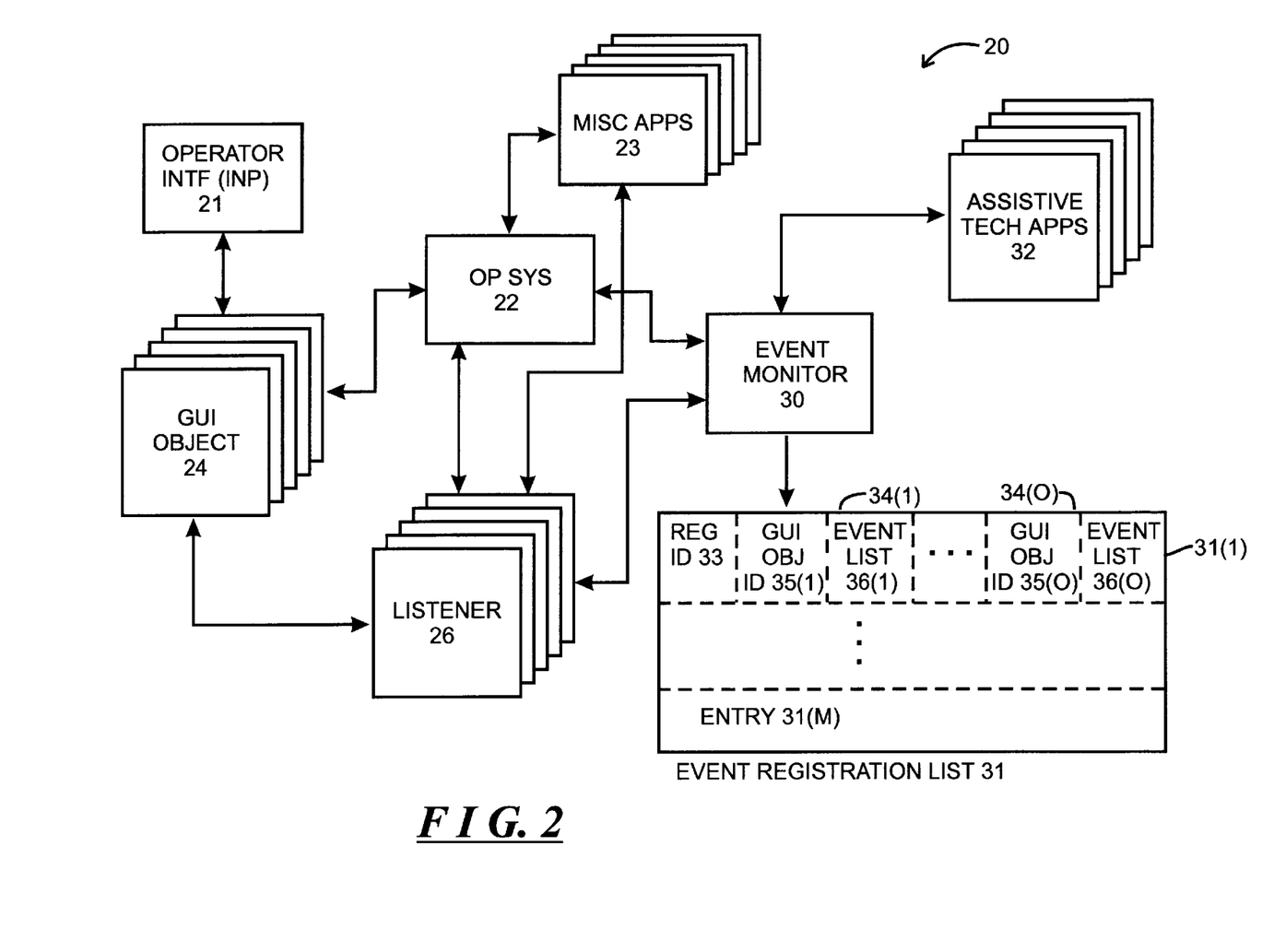
FIG. 2 is a functional block diagram of an event notification arrangement for use in connection with the digital computer system depicted in FIG. 1.

FIG. 2 depicts a functional block diagram of an event notification arrangement 20 for digital computer system 10 that is constructed to simplify provision of notifications to programs, such as assistive technology applications of events which occur in connection with objects comprising a graphical user interface. With reference to FIG. 2, the event notification arrangement 20 includes an operator interface 21, an operating system 22, one or more application programs, generally identified by reference numeral 23, and one or more objects, generally identified by reference numeral 24, comprising the graphical user interface. The objects 24 define components of the graphical user interface that typically will be displayed by the digital computer system's video display device 13.

During their processing, each application program 23 may generate object instantiation requests for provision to the operating system 22. In response to such object instantiation requests, the operating system 22 can instantiate ones of the objects 24, and notify the application program 23 which generated the object instantiation request when the object has been instantiated. The operating system 22 itself may also instantiate ones of the objects 24 without requiring requests from an application program 23; such objects 24 may comprise, for example, elements such as icons, a taskbar and the like, which may be displayed by digital computer system 10 on the video display device independently of any of the application programs being processed by the digital computer system 10. In either case, in addition to enabling an object 24 to be instantiated, the application program 23 or operating system 22, whichever initiated establishment of the object, can establish a listener, generally identified by reference numeral 26, which monitors the respective object 24 as described below.

After an object 24 has been instantiated, events may occur in connection therewith by means of operator input information that is received through the operator interface 21. The operator interface 21 receives operator input information from the operator input devices 12, in particular through the keyboard 12A, mouse 12B and the like, and provides the information relating to respective ones of the objects 24 to the respective objects 24. Thus, if, for example, the operator input information indicates that an object 24 is to be "selected," such that an operation may subsequently occur in connection with the object if the operator provides further information in connection therewith, the object 24 will generate event information for the listener or listeners 26 established therefor. Each listener 26 monitors the event information from the object for which it was established, and when it receives an event information item from the object 24 which it (that is. the listener 26) is monitoring, will provide an event notification to the application program 23 which established the listener 26.

At some points in their processing, an application program 23 may determine that ones of the graphical user interface objects 24 which were instantiated for it are no longer needed. When that occurs, the application program 23 can so notify the operating system 22, which can terminate the respective object 24. In addition, the application program 23 can terminate the listener 26 which was established to monitor event notification items generated by the object. Similarly, the operating system 22 can determine that an object 24 which it instantiated on its own is no longer needed, and, in that case, it can also terminate the object 24 and the listener 26 which was established to monitor event notification items generated by the object.

In accordance with the invention, the event notification arrangement also includes an event monitor 30 which, along with an event monitor registration list 31. The event monitor 30 essentially establishes listeners 26 for all of the graphical user interface objects 24 which are instantiated by the operating system 22, including both graphical user interface objects 24 which are instantiated before it (that is, the event monitor 30) begins operations and objects 24 which are instantiated after it (that is, the event monitor 30) begins operations. Further, as with the application programs 23, when a graphical user interface object 24 is terminated, the event monitor 30 will terminate the listener 26 which it established for the terminated graphical user interface object 24. Ones of the application programs, identified herein as "assistive technology" application programs 32, can register with the event monitor 30, in that process identifying ones of the objects or types of objects, and perhaps also the types of events, for which they wish to receive event notifications. When the event monitor 30 receives notification from a listener 26 which it established indicating that the associated object is generated event information contains which a registered assistive technology application program 32 has identified, it (that is, the event monitor 30) will provide the notification of the event to the assistive technology application program 32. It will be appreciated that, if multiple assistive technology application programs 32 have registered with the event monitor 30 to receive notifications for the same object 24, the event monitor 30 will provide notifications to all of such assistive technology application programs 32.

The event monitor registration list 31 includes one or more entries 31(1) through 31(M) (generally identified by reference numeral 31(m)). Each entry 31(m) is associated with one of the assistive technology application program 32 which has registered with the event monitor 30. Each entry 31(m) includes a plurality of fields, including a registered application program identifier field 33, and one or more object type identifier fields 34(1) through 34(O) (generally identified by reference numeral 34(o)). Each object type identifier field 34(o), in turn, includes an object type identifier portion 35(o), and may also include an event type list portion 36(o). The object type identifier portion 35(o) of each object type identifier field 34(o) contains an object type identifier which identifies one type of graphical user interface object 24 for which the assistive technology application program 32 for which the entry 31(m) was established, and the event type list portion 36(o) of the same object type identifier field 34(o) contains the identification of the type or types of events which occur in connection with the object(s) of the type identified in the object type identifier portion 35(o), for which the assistive technology application program 32 is to be notified. If the event type list portion 36(o) of the object type identifier field 34(o) is empty, then the assistive technology application program 32 is to be notified of all types of events which occur in connection with the object(s) of the type identified in the object type identifier portion 35(o).

Figure 3A:
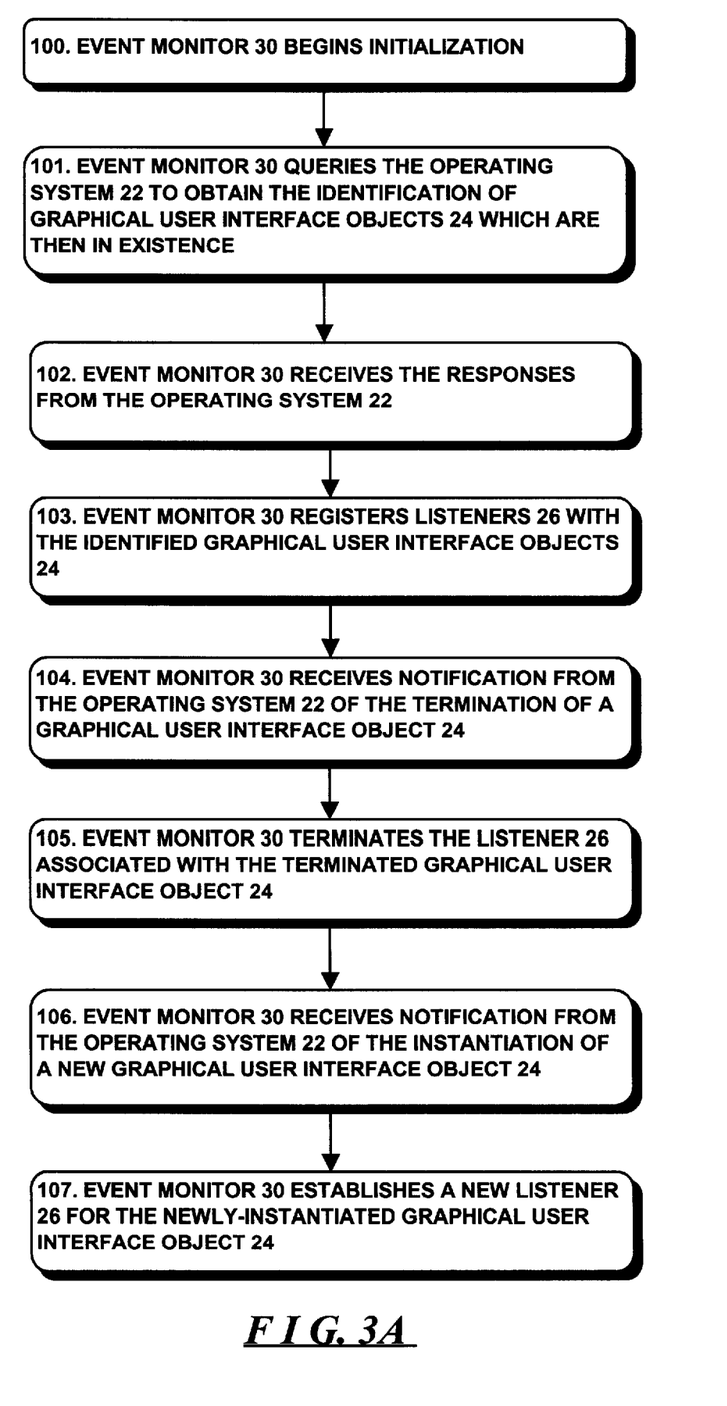
FIGS. 3A through 3C are flowcharts depicting operations in connection with the event notification arrangement depicted in FIG. 2.
Figure 3B:
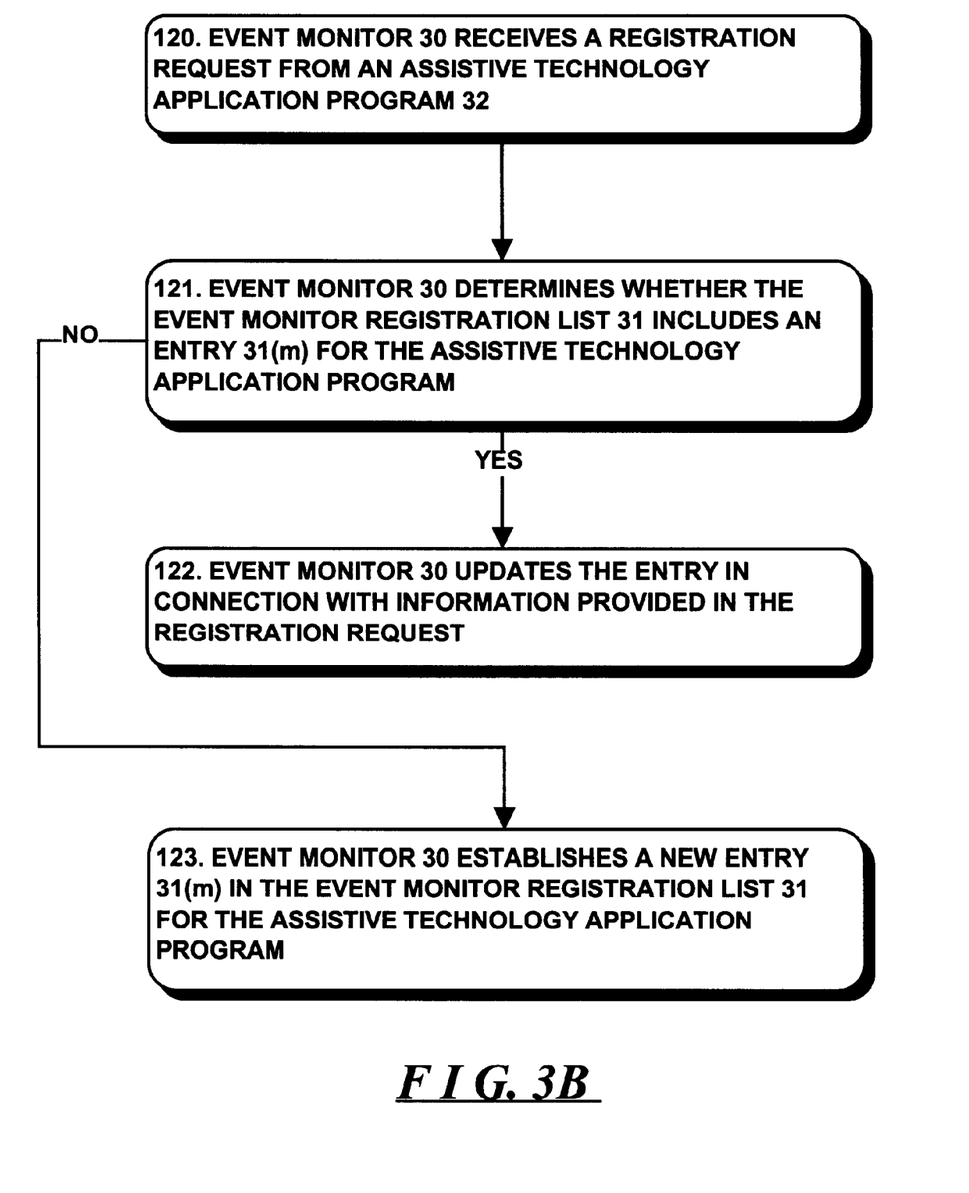
Figure 3C:
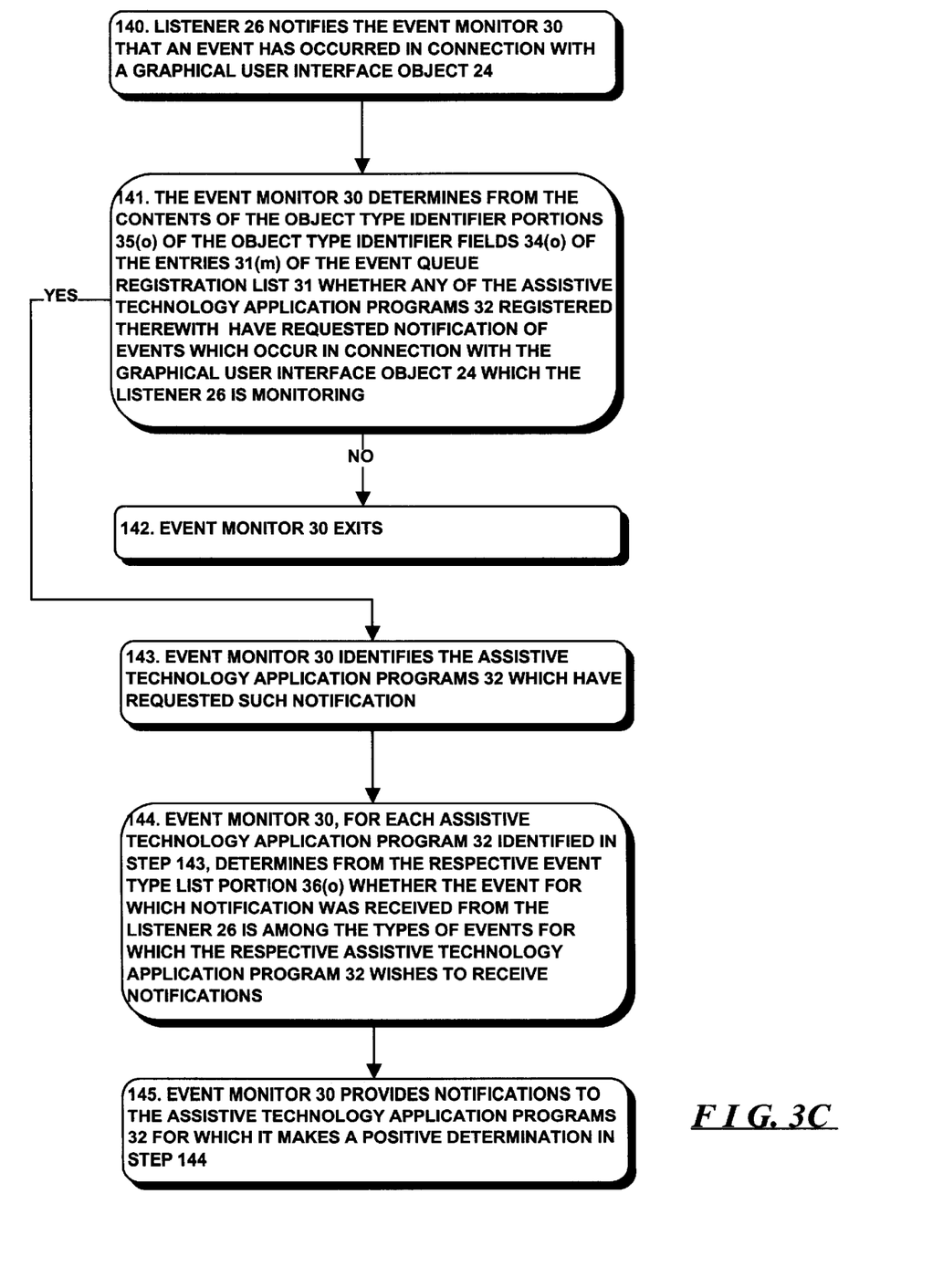

Operations performed by the event notification arrangement, in particular in connection with operations in connection with the event monitor 30, will be described in connection with FIGS. 3A through 3C. FIG. 3A depicts operations performed by the event monitor 30 in connection with registering listeners 26 for objects, which can occur during initialization of the event monitor 30 in connection with objects which are in existence when the event monitor 30 are initialized, and also subsequent to initialization of the event monitor 30 in connection with objects which are established after the event monitor is initialized. FIG. 3A also depicts operations performed by the event monitor 30 in connection with terminating listeners 26 for objects which are terminated. FIG. 3B depicts operations performed by the event monitor 30 in connection with registering assistive technology application programs 32. FIG. 3C depicts operations performed by the event monitor 30 in connection with providing notifications of events to the assistive technology application programs 32 registered therewith.

With reference initially to FIG. 3A, after the event monitor 30 begins initialization (step 100), it initially queries the operating system 22 to obtain the identification of graphical user interface objects 24 which are then in existence (step 101). After receiving the responses from the operating system 22 (step 102), it (that is, the event monitor 30) registers listeners 26 for the identified graphical user interface objects 24 with the respective object (step 103). Subsequently, if the event monitor 30 receives notification from the operating system 22 of the termination of a graphical user interface object 24 (step 104), it (that is, the event monitor 30) will terminate the listener 26 (step 105). On the other hand, if the event monitor 30 receives notification from the operating system 22 of the instantiation of a new graphical user interface object 24 (step 106), it (that is, the event monitor 30) will establish a new listener 26 therefor (step 107).

FIG. 3B depicts operations performed by the event monitor 30 in connection with registering assistive technology application programs 32. With reference to FIG. 3B, when the event monitor 30 receives a registration request from an assistive technology application program 32 (step 120), it will determine whether the event monitor registration list 31 includes an entry 31(m) for the assistive technology application program (step 121), and if so, may update the entry in connection with information provided in the registration request (step 122). If the event monitor 30 determines in step 121 that it does not have an entry 31(m) for the assistive technology application program, it can establish a new entry 31(m) in the event monitor registration list 31 therefor (step 123).

FIG. 3C depicts operations performed by the event monitor 30 in connection with providing notifications of events to the assistive technology application programs 32 registered therewith. With reference to FIG. 3C, when a listener 26 notifies the event monitor 30 that an event has occurred in connection with a graphical user interface object 24 (step 140), the event monitor 30 will determine from the contents of the object type identifier portions 35(o) of the object type identifier fields 34(o) of the entries 31(m) of the event queue registration list 31 whether any of the assistive technology application programs 32 registered therewith have requested notification of events which occur in connection with the graphical user interface object 24 which the listener 26 is monitoring (step 141). If the event monitor makes a negative determination in step 141, that is, if it determines that no assistive technology application programs registered therewith have requested notification of events which occur in connection with the graphical user interface object 24 which the listener 26 is monitoring, it will exit (step 142). On the other hand, if the event monitor 30 makes a positive determination in step 141, it will identify the assistive technology application programs 32 which have requested such notification (step 143), for each such assistive technology application program 32 determine from the respective event type list portion 36(o) whether the event for which notification was received from the listener 26 is among the types of events for which the respective assistive technology application program 32 wishes to receive notifications (step 144). Thereafter, the event monitor 30 will provide notifications to the assistive technology application programs 32 for which it makes a positive determination in step 144 (step 145).

The invention provides a number of advantages. In particular, the invention provides an event notification arrangement 20 which permits an application program, such as an assistive technology application program 32, to receive notifications of events which occur in connection with objects comprising the graphical user interface, without the necessity of requiring it (that is, the assistive technology application program) itself to actually register a listener for each of the objects, thereby relieving the assistive technology program of the need to either identify the objects comprising the graphical user interface that already exist when it (that is, the assistive technology program) is initialized, and to register listeners therewith, or to monitor the subsequent instantiation of such objects by the operating system so that it can determine whether the register listeners therefor, and to register listeners with the ones of the objects for which it (that is, the assistive technology program) wishes to receive notifications.

It will be appreciated that a number of modifications may be made to the event notification arrangement 20 as described above. For example, although the event monitor 30 has been described as providing a simplified notification arrangement in connection with application programs which are in the form of assistive technology programs, it will be appreciated that any types of application programs may be efficiently notified by use of the event monitor.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An event aggregator for use in a computer system having a plurality of objects, each of which has a type, generates events and requires a listener to register with it in order to receive notification of the events, the event aggregator allowing an application program to receive notification of events generated by selected objects without registering with each object and comprising:
   a registration list module that receives a registration request from the application program indicating from which object types the application program wants to receive notification of events;
   an object monitor that continually checks the computer system for newly created objects and registers a listener with each newly created object; and
   an event monitor that notifies the application program if any listener registered by the object monitor receives notification of an event generated by an object type indicated by the registration request.

2. The event aggregator of claim 1 wherein the registration list module generates a registration list of object types from which the application program wants to receive a notification of events.

3. The event aggregator of claim 2 wherein the registration list comprises, for each object type, an event type list indicating the types of event of which the application program wants to receive notification and wherein the event monitor comprises a mechanism that notifies the application program if any listener receives notification of an event type generated by an object type on the registration list.

4. The event aggregator of claim 1 wherein the object monitor comprises a mechanism that checks for the instantiation of objects during operation of the computer system and registers a listener with each instantiation.

5. The event aggregator of claim 1 wherein the object monitor comprises a mechanism that checks for objects in existence when the event aggregator is initialized and registers a listener with each existing object.

6. The event aggregator of claim 1 wherein the object monitor comprises a destruction mechanism that terminates a listener when the object with which the listener is registered is destroyed.

7. A method for use in a computer system having a plurality of objects, each of which has a type, generates events and requires a listener to register with it in order to receive notification of the events, the method allowing an application program to receive notification of events generated by selected objects without registering with each object and comprising:
   (a) creating an event aggregator for consolidating event notifications;
   (b) receiving a registration request at the event aggregator from the application program indicating from which object types the application program wants to receive notification of events;
   (c) using the event aggregator to continually check the computer system for newly created objects and register a listener with each newly created object; and
   (d) using the event aggregator to notify the application program if any listener registered by the event aggregator receives notification of an event generated by an object type indicated by the registration request.

8. The method of claim 7 wherein step (b) comprises generating a registration list of object types from which the application program wants to receive a notification of events.

9. The method of claim 8 wherein the registration list comprises, for each object type, an event type list indicating the types of event of which the application program wants to receive notification and wherein step (d) comprises notifying the application program if any listener receives notification of an event type generated by an object type on the registration list.

10. The method of claim 7 wherein step (c) comprises checking for the instantiation of objects during operation of the computer system and registering a listener with each instantiation.

11. The method of claim 7 wherein step (c) further comprises checking for objects in existence when the event aggregator is created and registering a listener with each existing object.

12. The method of claim 7 wherein step (c) comprises terminating a listener when the object with which the listener is registered is destroyed.

13. A computer program product for use in a computer system having a plurality of objects, each of which has a type, generates events and requires a listener to register with it in order to receive notification of the events, the computer program product allowing an application program to receive notification of events generated by selected objects without registering with each object and comprising a computer usable medium having computer readable program code thereon, including:

program code that creates an event aggregator for consolidating event notifications;

program code in the event aggregator that receives a registration request from the application program indicating from which object types the application program wants to receive notification of events;

program code in the event aggregator that continually checks the computer system for newly created objects and registers a listener with each newly created object; and     program code in the event aggregator that notifies the application program if any listener registered by the program code in the event aggregator receives notification of an event generated by an object type indicated by the registration request.

14. The computer program product of claim 13 wherein the program code that receives a registration request comprises program code that generates a registration list of object types from which the application program wants to receive a notification of events.

15. The computer program product of claim 14 wherein the registration list comprises, for each object type, an event type list indicating the types of event of which the application program wants to receive notification and wherein the program code that notifies the application program comprises program code that notifies the application program if any listener receives notification of an event type generated by an object type on the registration list.

16. The computer program product of claim 13 wherein the program code that continually checks the computer system for objects comprises program code that checks for the instantiation of objects during operation of the computer system and registers a listener with each instantiation.

17. The computer program product of claim 13 wherein the program code that continually checks the computer system for objects further comprises program code that checks for objects in existence when the event aggregator is created and registers a listener with each existing object.

18. The computer program product of claim 13 wherein program code that continually checks the computer system for objects comprises program code that terminates a listener when the object with which the listener is registered is destroyed.

* * * * *